(12) United States Patent
Surply et al.

(10) Patent No.: US 8,640,986 B2
(45) Date of Patent: Feb. 4, 2014

(54) TURBOJET NACELLE AND METHOD FOR CONTROLLING SEPARATION IN A TURBOJET NACELLE

(75) Inventors: Thierry Surply, Cornebarrieu (FR); Christophe Bourdeau, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 742 days.

(21) Appl. No.: 12/326,604

(22) Filed: Dec. 2, 2008

(65) Prior Publication Data

US 2009/0140104 A1 Jun. 4, 2009

(30) Foreign Application Priority Data

Dec. 3, 2007 (FR) ..................................... 07 59488

(51) Int. Cl.
*B64D 33/02* (2006.01)
*B64C 21/04* (2006.01)

(52) U.S. Cl.
USPC ........................... 244/53 B; 244/207; 244/204

(58) Field of Classification Search
USPC ........................................ 244/204, 207, 53 B
See application file for complete search history.

(56) References Cited

U.S. PATENT DOCUMENTS

| | | | | |
|---|---|---|---|---|
| 3,664,612 A | * | 5/1972 | Skidmore et al. ............. | 44/53 B |
| 4,132,240 A | * | 1/1979 | Frantz .......................... | 244/53 B |
| 4,738,416 A | * | 4/1988 | Birbragher .................... | 244/207 |
| 4,865,268 A | * | 9/1989 | Tracksdorf ................... | 244/53 B |
| 4,993,663 A | * | 2/1991 | Lahti et al. ................... | 244/53 B |
| 5,447,283 A | * | 9/1995 | Tindell ......................... | 244/207 |
| 5,485,975 A | * | 1/1996 | Tindell ......................... | 244/53 B |
| 5,743,493 A | * | 4/1998 | McCaughan ................. | 244/207 |
| 5,934,611 A | * | 8/1999 | Tindell et al. ................ | 244/53 B |
| 6,109,565 A | | 8/2000 | King, Sr. | |
| 6,179,251 B1 | * | 1/2001 | Tindell et al. ................ | 244/207 |
| 6,334,753 B1 | * | 1/2002 | Tillman et al. .................... | 415/1 |
| 6,390,418 B1 | * | 5/2002 | McCormick et al. ........ | 244/204 |
| 6,634,595 B2 | * | 10/2003 | Koncsek et al. ............ | 244/53 B |
| 6,708,711 B2 | * | 3/2004 | Surply et al. ................ | 244/53 B |
| 7,048,230 B2 | * | 5/2006 | Meyer .......................... | 244/208 |
| 7,617,670 B2 | * | 11/2009 | Truax et al. ................. | 244/53 B |
| 7,708,230 B2 | * | 5/2010 | Cloft et al. .................... | 244/207 |
| 7,784,732 B2 | * | 8/2010 | Owens et al. ............... | 244/53 B |
| 7,870,721 B2 | * | 1/2011 | Winter et al. ................ | 137/15.1 |
| 8,082,726 B2 | * | 12/2011 | Cloft ............................ | 244/53 B |
| 8,209,953 B2 | * | 7/2012 | Winter et al. ................ | 60/226.1 |
| 2010/0327120 A1 | * | 12/2010 | Chelin et al. ................. | 244/207 |

FOREIGN PATENT DOCUMENTS

| | | |
|---|---|---|
| EP | 0 934 878 A2 | 8/1999 |
| GB | 619390 | 3/1949 |
| GB | 2 030 674 A | 4/1980 |

* cited by examiner

*Primary Examiner* — Tien Dinh
*Assistant Examiner* — Steven Hawk
(74) *Attorney, Agent, or Firm* — Patterson Thuente Pedersen, P.A.

(57) ABSTRACT

An aircraft turbojet nacelle comprising blowing means intended to inject a tangential airflow ($F_t$) into the internal volume (V) of the nacelle, said blowing means being provided in a wall of the air intake of the nacelle in the supersonic area of said air intake. The invention also concerns a method for controlling separation in an aircraft nacelle, wherein a tangential airflow is injected ($F_t$) into the internal volume (V) of the nacelle in the locally supersonic area of the air intake so as to pull the main airflow (F) into the extension of the inner wall of the nacelle.

13 Claims, 5 Drawing Sheets

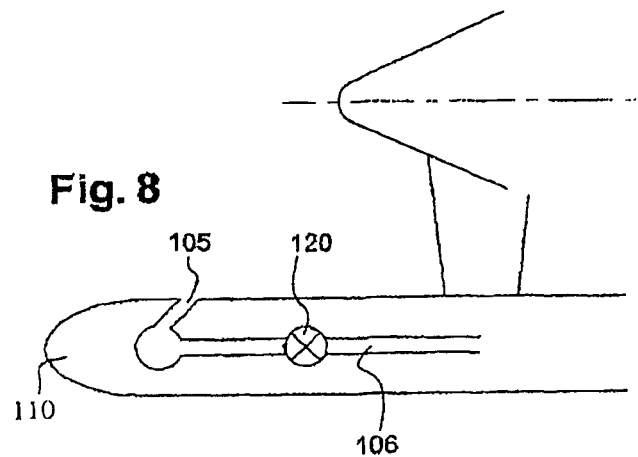
Fig. 8
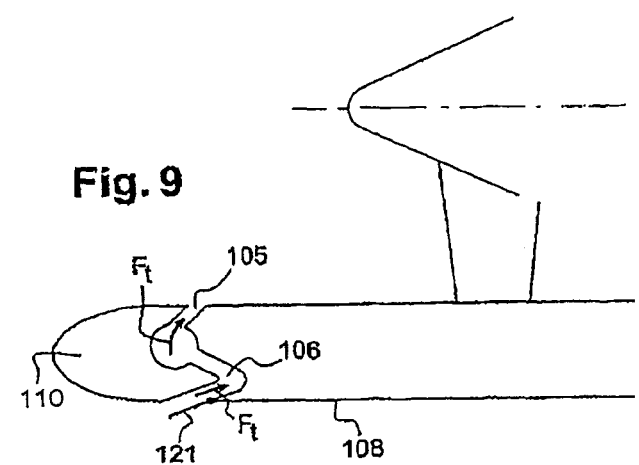
Fig. 9
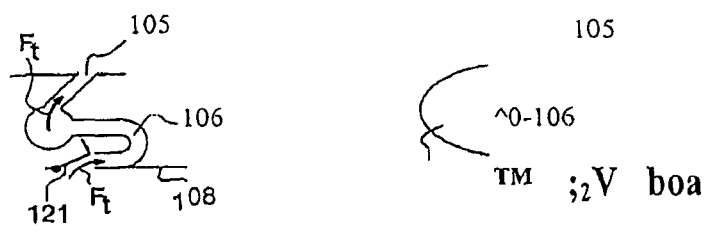
Fig. 10A
Fig. 10B

TURBOJET NACELLE AND METHOD FOR CONTROLLING SEPARATION IN A TURBOJET NACELLE

RELATED APPLICATION

The present application claims priority to French Application No. 07 59488 filed Dec. 3, 2007, which is incorporated herein in its entirety by reference.

TECHNICAL FIELD

The present invention is an aircraft component. More particularly, the present invention is a nacelle for a turbojet mounted on an aircraft.

BACKGROUND OF THE INVENTION

The invention concerns a turbojet nacelle. More specifically, the invention concerns means for controlling the separation of airstreams that may occur in the nacelle of a turbojet. The term separation is understood to mean the space between all or part of the airflow crossing the nacelle of the turbojet and the inner wall of said nacelle that it must normally run along. The expression controlling the separation is understood to mean eliminating, or at the very least sufficiently reducing, said separation so as to be able to optimize the shape of said nacelle in response to high-speed requirements while maintaining low-speed performance. The invention also concerns a method for controlling the separation of airstreams, tending to eliminate or reduce said separation in the turbojet nacelle.

In a turbojet nacelle, the dimensioning of the air intake through which the airflow supplying the turbojet rushes in must take into account several conflicting requirements depending upon whether one is cruising, meaning at high speeds, or at low speeds.

In effect, to obtain good turbojet performance during takeoff and at low speeds there must be a sufficiently large air intake with thick profiles. The narrower the nacelle air intake is, the greater the risks of separation along the inner wall of the nacelle are. Such separation is harmful to the operability of the turbojet insomuch as part of the airflow that must supply it has high pressure distortion and speed distortion. The size of the air intake neck and the thickness of the profiles of the nacelle therefore influence the performance of the turbojet at low speeds. However, if the size of the nacelle air intake neck and/or the thickness of the profile of said nacelle are too great, it is harmful to the performance of the turbojet at high speeds, particularly from the point of view of weight and aerodynamic drag.

Thus, all turbojet nacelles today in the field of civil and military aeronautics are dimensioned by taking into account these two competing constraints so that, with respect to the shape of the air intake, a compromise between low-speed requirements and high-speed performance objectives is reached.

FIG. 1 shows a cross section of a nacelle 1 from the prior art in which a turbojet 2 is housed. A front part of the nacelle 1 is equipped with an air intake 3 having lips 7 through which a main airflow F penetrates into the internal volume V of said nacelle 1. The terms front and rear are understood in relation to the direction of flow of the airflow inside the nacelle 1. The air intake 3 is formed from an open front end of the nacelle 1.

Insofar as the air intake is dimensioned so as not to create aerodynamic drag that is too great at high speeds, at low speeds and during takeoff (FIG. 2), a slight separation d is observed in the inner wall 4 of the neck 5 of the air intake 3. The effect of this separation d is a pocket of air against the inner wall 4 of the neck 5 of the air intake 3 which separates from the rest of the main airflow F and revolves locally.

SUMMARY OF THE INVENTION

In the present invention, the object is to provide an aircraft nacelle in which the flow of the airflow is guided so as to be kept parallel to the longitudinal axis of the nacelle and to thereby eliminate any separation.

To do so, a nacelle is created in which a guiding airflow may be blown along the inner wall of the air intake to mix with the main airflow entering the nacelle through the air intake. The guiding airflow is conveyed directly along the inner wall of the nacelle, for example from a blowing slot or blowing orifice provided in the wall of said nacelle. More specifically, the guiding airflow is injected into the internal volume of the nacelle along the inner wall at the air intake neck where the flow of air is locally supersonic. In effect, it has been observed that if a tangential airflow is blown into the supersonic area of the nacelle, the tangential airflow tends to pull the main airflow which could locally separate, in the main flow axis, along the inner wall of the nacelle. There is interaction between the flow of the airstreams of the main airflow running along the inner wall of the nacelle, and which tend to separate, and the energy provided by the guiding airflow. The guiding airflow pulls the airstreams which separate from the inner wall of the nacelle where they rejoin the main flow. The guiding airflow may come from outside the nacelle or be taken downstream from the air intake, for example at the turbojet. Advantageously, the guiding airflow is taken from outside the nacelle so as not to reduce thrust or hurt turbojet performance.

In general, the guiding air blown into the internal volume of the nacelle advantageously has tangential airflow-generating pressure that is greater than or equal to 0.8 times the main airflow-generating pressure, and preferentially between 0.8 and 1.5 times the main airflow-generating pressure. It is good to have guiding airflow-generating pressure close to the main airflow-generating pressure, and therefore a ratio close to 1.0, in the sense that the acceleration of the blown airflow is mainly due to the local negative pressure of the main airflow at the air intake neck. This low pressure of the main flow at the air intake neck, created by the suction of the turbojet, is sufficient to generate an expansion ratio suitable for accelerating the guiding airflow until a locally supersonic flow is obtained under the device's operating conditions.

The object of the invention is therefore an aircraft turbojet nacelle wherein it comprises blowing means intended to inject a tangential airflow into the internal volume of the nacelle, said blowing means being provided in a wall of the nacelle air intake in the supersonic area of said air intake.

The term tangential is understood to mean that the airflow is injected along the inner wall of the nacelle at an angle of 0° to 45° in relation to the longitudinal axis of the nacelle, and preferentially at a 10° angle.

The supersonic area of the air intake is most often located at the lips and neck of the air intake.

According to the embodiments of the turbojet nacelle according to the invention, all or part of the following additional characteristics may be provided:

the blowing means end at the air intake neck;
the tangential airflow has a generating pressure greater than or equal to 0.80 times the main airflow-generating pressure;
the tangential airflow has a generating pressure between 0.80 and 1.5 times the main airflow-generating pressure;

the blowing means comprise at least one air inlet line capable of taking the tangential airflow from outside the nacelle;

the blowing means comprise at least one air inlet line capable of taking the tangential airflow at the turbojet compressors intended to be housed in the nacelle;

the blowing means comprise at least one air inlet line capable of taking the tangential airflow at the nacelle fan;

the blowing means comprise at least one blowing slot and/or at least one blowing orifice ending in the internal volume of said nacelle;

the blowing means comprise a multiplicity of blowing slots and/or blowing orifices spread over the inner perimeter of the air intake;

the nacelle comprises means of sealing the blowing means. The invention also concerns a method for controlling separation in an aircraft nacelle wherein a tangential airflow is injected into the internal volume of the nacelle in the locally supersonic air intake area so as to pull the airstreams that separate from the inner wall of the nacelle in the main airflow.

In one particular embodiment of the method according to the invention, one may provide for the tangential airflow to be injected when the aircraft is at low speeds.

Likewise, one may provide for the tangential airflow to stop being injected when the aircraft is at cruising speed or at a high speed.

Advantageously, activation of the blowing device for injecting the tangential airflow is connected to the outlet of the aircraft's high-lift devices.

The invention will be better understood upon reading the following description and examining the figures that accompany it. The latter are presented as non-limiting examples of the invention.

BRIEF DESCRIPTION OF THE FIGURES

The figures show:

FIG. 8 is a partial cross-sectional schematic representation of a nacelle at an air intake equipped with a sealing device for the blowing means according to a first embodiment;

FIG. 9 is a partial cross-sectional schematic representation of a nacelle at an air intake equipped with a sealing device for the blowing means according to a second embodiment, the sealing device being inactive;

FIGS. 10A and 10B are a partial cross-sectional representation of a nacelle at an air intake equipped with a sealing device for the blowing means according to a third embodiment, the sealing device being inactive (FIG. 10A) and active (FIG. 10B).

DETAILED DESCRIPTION OF THE DRAWINGS

As shown above, in the invention, a tangential airflow is injected into the internal volume of the nacelle in the supersonic area of said nacelle, meaning at the air intake neck, or slightly upstream or downstream of the air intake neck. The tangential airflow is injected at an angle 0° to 45° in relation to the inner wall of the nacelle and preferentially around 10°.

The tangential airflow runs along the inner wall of the nacelle. The tangential airflow injected into the supersonic area of the air intake makes it possible to pull the main airflow, which tends to separate from the inner wall of the nacelle a certain distance, so that it must normally run along, in the main airflow line, meaning parallel to the inner wall of the nacelle I a manner that is attached to (not separated from) the inner wall of the nacelle. The term main airflow is understood to mean the airflow penetrating the nacelle through the air intake and intended to supply the turbojet housed in the nacelle.

Tests were conducted modifying the angle of attack of the nacelle in a prior art nacelle (FIGS. 3A and 3B) and in a nacelle according to the invention quipped with a blowing slot (FIGS. 4A, 4B, 4C and 4D). These tests make it possible to show that separation creation is not as great in the nacelle according to the invention, despite the increased angle of attack, as in the prior art nacelle. The angle of attack is the angle between the direction of airflow entering the nacelle and the longitudinal axis of the nacelle. Generally, high angles of attack occur at slow aircraft speeds, while angle of attack generally decreases with increasing airspeeds.

Figure 1:
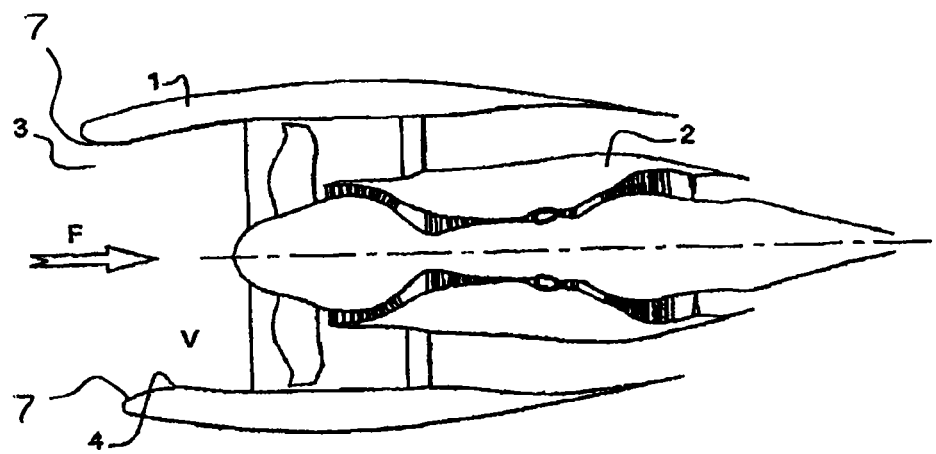
FIG. 1 is a cross section of an aircraft nacelle according to the previously described prior art.
Figure 2:
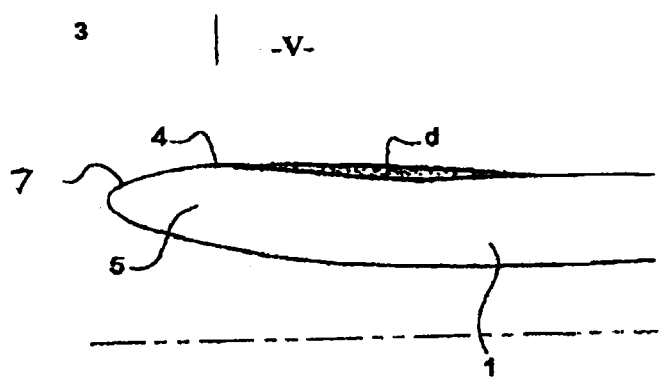
FIG. 2 is an enlargement of the nacelle in FIG. 1 at a previously described air intake lip.
Figure 3A:
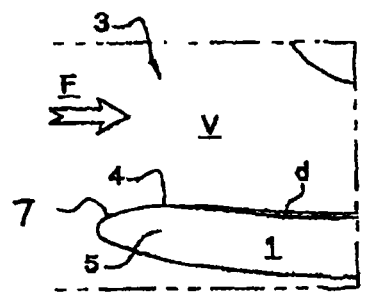
FIGS. 3A and 3B are schematic representations of a nacelle from the prior art at an air intake lip for a 22° angle of attack (FIG. 3A) and a 23° angle of attack (FIG. 3B)

In FIG. 3A, the angle of attack of the nacelle is 22°, which corresponds to an acceptable dimensioning of the air intake 3 for both low speeds and high speeds. Thus, almost no separation d is noted in the inner wall 4 of the neck 5 of the air intake 3.

Figure 3B:
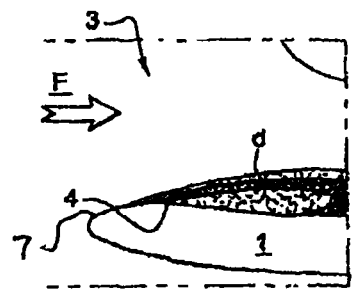

In FIG. 3B, the dimensions of the nacelle 1 are reduced so that the angle of attack is 23°. Just increasing the angle of attack by one degree is enough to create separation d that is substantially greater than d of FIG. 3A and that is very harmful to the low-speed performance of the nacelle 1.

FIGS. 4A, 4B, 4C and 4D show an enlargement of a nacelle 100 according to the invention at an air intake 103.

The nacelle 100 is equipped with a blowing slot 105 (downstream of the lip 102) provided in the supersonic area 101 of the air intake 103. The slot 105 ends in the internal volume V of the nacelle 100 at the inner wall 104 of said nacelle 100. The slot 105 blows a tangential airflow along the inner wall 104 of the nacelle 100, tending to pull the portion of the main flow F that could separate from the extension of the inner wall 104 of the nacelle 100. Such pulling ensures that the main flow F remains attached to the inner wall 104 as the main flow F proceeds to the turbojet.

Figure 4A:
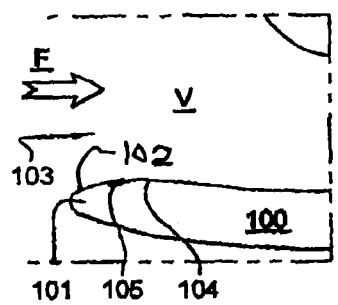
FIGS. 4A, 4B, 4C and 4D are schematic cross-sectional representations of a nacelle according to the invention at an air intake lip for a 22° angle of attack (FIG. 4A), 27° angle of attack (FIG. 4B), 28° angle of attack (FIG. 4C) and 29° angle of attack (FIG. 4D)
Figure 4B:
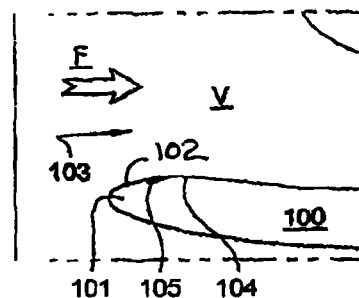
Figure 4C:
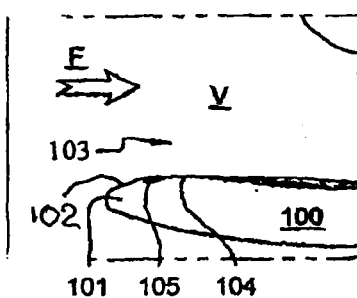

Thus, as shown in FIGS. 4A, 4B, and 4C, no separation of the main airflow F is observed along the inner wall 104 of the neck of the air intake, while the angle of attack of the nacelle 100 is increased by several degrees since it is 22° in FIG. 4A and 27° and 28° in FIGS. 4B and 4C respectively as a result of the tangential airflow injected through blowing slot 105.

This absence of separation when the nacelle has at a high angle of attack is obtained through the injection of a tangential airflow through the blowing slot 105, while for an angle of attack hardly greater than 22°, without this injection of tangential airflow, an unacceptable separation for low-speed performance of the nacelle is obtained in the prior art (FIG. 3B).

Figure 4D:
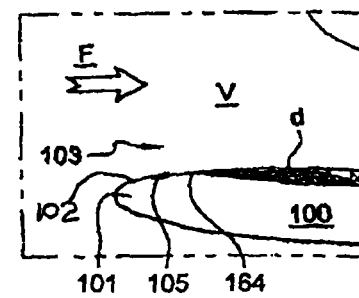

As can be seen in FIG. 4D, separation d is minimized and remains acceptable. Such separation d appears when the angle of attack of the nacelle 100 is 29°.

Instead of increasing the angle of attack of the nacelle 100, the diameter of the nacelle 100 can be reduced and/or the thickness of its profile can be reduced to increase the performance of the nacelle 100 at high speeds. Thus, with the invention, nacelles that are highly efficient at high speeds can be created without losing low speed performance since the effect of tangential airflow through the blowing slot 105 increases resistance of the main airflow to separating, as noted above.

The tangential airflow injected into the internal volume of the nacelle may be injected over an entire inner perimeter of said nacelle, as when blowing slot 105 is circumferential, or over just a partial perimeter, for example to prevent separation in cross winds, meaning for a main airflow reaching the nacelle laterally. In such a case, blowing slot 105 is formed in an arc at the sides of the nacelle 100.

The tangential airflow is conveyed by all blowing means into the internal volume of the nacelle.

Figure 5:
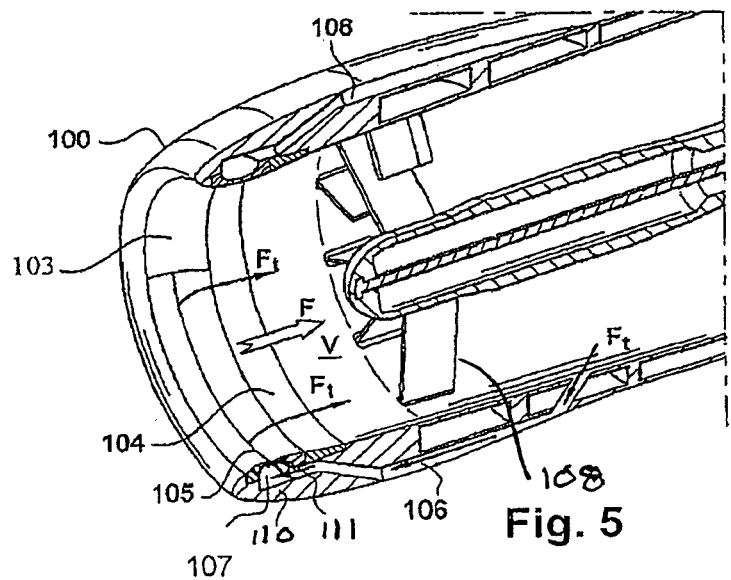
FIG. 5 is a schematic cross-sectional representation of a nacelle equipped with a blowing device according to a first embodiment of the invention.

For example, and as shown in FIG. 5, the blowing means are equipped with a blowing slot 105 ending in the internal volume V of the nacelle 100 at the inner wall 104 of the neck 110 of the air intake, meaning in the supersonic area of the air intake 103.

An air inlet line 106 makes it possible to convey the tangential airflow $F_t$ from an area of the nacelle 100 located downstream from the fan 140 of the turbojet to the blowing slot 105. High pressure generated by the fan 140 causes the flow $F_t$ to flow forward to be injected through slot 105. More specifically, a front end 111 of the air inlet line 106 ends in a cavity 107, the cavity 107 being provided in the thickness of the wall of the neck 110 of the air intake 103. The term thickness is understood to mean the size of the wall extending radially in relation to the longitudinal axis of the nacelle 100. The cavity 107 extends into the perimeter of the nacelle 100. The slot 105 is provided in the inner wall 104 of the neck 110 of the air intake 103 coinciding at least partially with the cavity 107. Thus, the tangential airflow $F_t$ accumulated in the cavity 107 escapes into the internal volume V of the nacelle 100 through the slot 105. Blowing orifices can be made instead of or in addition to the blowing slots 105. The tangential airflow $F_t$ is sent through the air inlet line 106 from the back to the front of the nacelle 100 where it mixes with the main airflow F along the inner wall 104 of the air intake 103, causing main airflow F to remain attached to inner wall 104 or, at high angles of attack, to detach therefrom an acceptably minimal distance d.

The nacelle 100 may be equipped with one or more cavities 107, each supplied with tangential airflows Ft by one or more air inlet lines 106.

Figure 6:
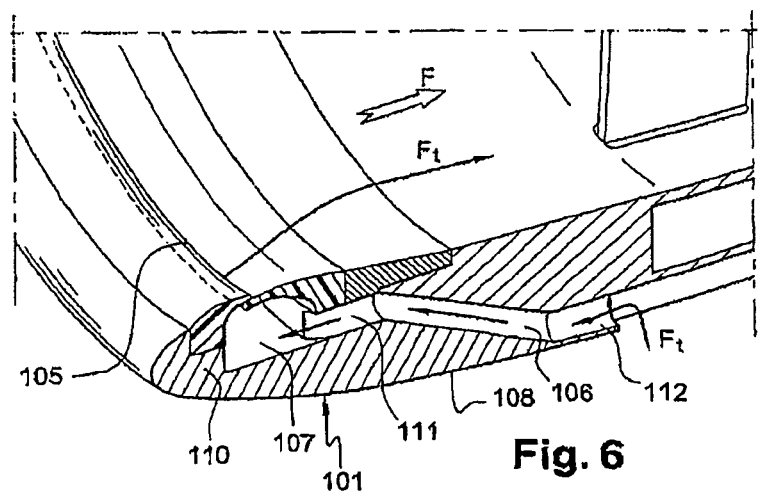
FIG. 6 is a cross-sectional enlargement of the air intake of a nacelle equipped with a second embodiment of a blowing device according to the invention.

FIG. 6 shows another embodiment of the air inlet line 106 which this time takes the tangential airflow $F_t$ from outside the nacelle 100. The air inlet line 106 is equipped with a rear end 112 ending at the outer wall 108 of the nacelle 100, the front end 111 ending in a cavity 107. The rear end 112 is disposed in an area of high pressure, thereby urging the forward flow of the air flow $F_t$.

Of course, a same nacelle 100 may be equipped with several different air inlet lines 106 taking the tangential airflow $F_t$ at different places outside of and/or inside the nacelle 100.

Figure 7:
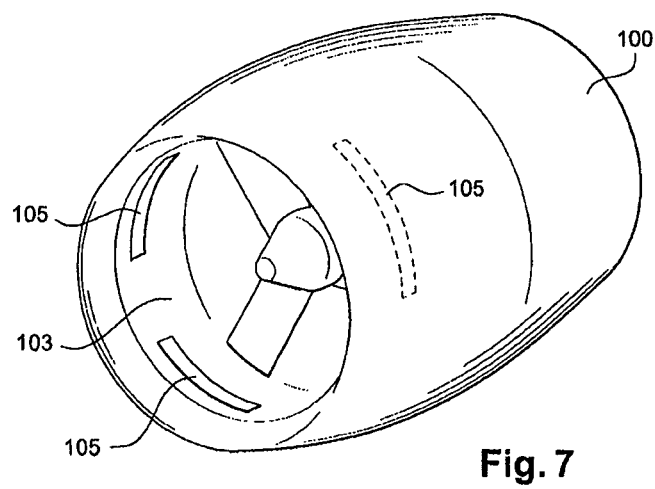
FIG. 7 is a schematic representation of a nacelle according to the invention, equipped with another embodiment of a blowing device.

FIG. 7 shows an external view of a nacelle 100 equipped with blowing slots 105 according to the invention. More specifically, the wall of the nacelle 100 is equipped with three slots 105 separated hermetically from one another and each capable of supplying the internal volume of the nacelle 100 over ⅓ of the perimeter. The slots 105 may be supplied with tangential flows through the accumulation of the tangential flow in a same cavity 107, or through specific cavities each coinciding with at least one slot 105.

So as to use the blowing device according to the invention only when it is needed to pull the main airflow along the wall, meaning mainly during takeoff and at low speeds, the nacelle may be equipped with one or more sealing devices capable of sealing the blowing orifices and/or blowing slots 105 in a reversible manner on command.

As shown in FIG. 8, a sealing device may, for example, comprise a valve 120 housed inside the air inlet line 106 and capable of blocking the entry of the tangential flow $F_t$ upstream of the blowing slots and/or blowing orifices 105 and/or at the cavity 107 and/or at the blowing slots and/or blowing orifices 105.

In another embodiment of the invention and as shown in FIGS. 9, 10A and 10B, the sealing device may consist of an air inlet 121 that may be activated to translate fore and aft. More specifically, the air inlet 121 that may be activated is formed by a portion of the outer wall 108 of the nacelle whose displacement allows it to lengthen into the extension of the outer wall 108 so as to seal the air intake (the aft disposition of FIG. 10B) or on the other hand to move away from said outer wall 108 so as to allow air to enter the air inlet line 106 (the forward disposition of FIGS. 9 and 10A). The displacement of the air inlet 121 may occur toward the outside of the nacelle (FIG. 9), or toward the inside (FIGS. 10A and 10B). The air inlet 121 of the outer wall 108 as shown in FIGS. 10A and 10B is housed in the volume of the wall of the nacelle when the sealing device is inactive, meaning when it is not sealing the air passage, which makes it possible to prevent harmful aerodynamic drag.

The sealing device may be controlled remotely and particularly from the aircraft's cockpit. In another embodiment, the sealing device may be related to the plane's configuration so that the sealing device is automatically active when the plane is in high lift configuration and deactivated when the plane is in clean configuration. In this case, activation of the tangential airflow injection is ordered by deploying the high lift elements. In another embodiment, the sealing device may be pressure-controlled or controlled by sensed angle of attack.

The invention claimed is:

1. Aircraft turbojet nacelle wherein it comprises blowing means intended to inject a tangential airflow ($F_1$) taken from outside the nacelle into an internal volume (V) of the nacelle, said blowing means being provided in a wall of an air intake of the nacelle in a supersonic area of said air intake, the blowing means comprising at least one air inlet line equipped with a rear end and a front end, the rear end ending at an outer wall of the nacelle and capable of taking the tangential airflow from outside the nacelle and the front end ending in the nacelle in the supersonic area proximate a forward lip of said air intake where airflow is locally supersonic.

2. The nacelle according to claim 1, in which the blowing means end comprises at least one blowing slot ending in the internal volume of said nacelle.

3. The nacelle according to claim 1, in which the tangential airflow has a pressure between 0.8 and 1.5 times the pressure of a main airflow (F).

4. The nacelle according to claim 1, in which a pressure ratio between the tangential airflow injected into the internal volume of the nacelle and the main airflow circulating in the internal volume of the nacelle is close to 1.

5. The nacelle according to claim 1, in which the blowing means comprise at least one blowing orifice ending in the internal volume of said nacelle.

6. The nacelle according to claim 1, comprising means of sealing the blowing means.

7. The nacelle according to claim 1, wherein the tangential airflow is injected over the entire inner perimeter of the nacelle.

8. The nacelle according to claim 2, wherein the at least one blowing slot comprises three slots, wherein each of the three slots is capable of injecting a tangential airflow to the internal volume of the nacelle over one-third of the inner perimeter of the nacelle.

9. A method for controlling separation in an aircraft nacelle, comprising taking a tangential airflow ($F_t$) from outside the nacelle and injecting the tangential airflow into an internal volume (V) of the nacelle in a locally supersonic area of an air intake, proximate a forward lip of said air intake where airflow is locally supersonic, the tangential airflow acting on airstreams that tend to separate from an inner wall of the nacelle in a main airflow (F) to maintain such airstreams in attachment with the inner wall.

10. The method according to claim 9, including injecting the tangential airflow when the aircraft is at a relatively low speed.

11. The method according to claim 9, including ordering activation of the tangential airflow injection by means of deployment of high lift elements of an aircraft.

12. The method according to claim 9, wherein the tangential airflow is injected over the entire inner perimeter of the aircraft nacelle.

13. The method according to claim 9, wherein the tangential airflow is injected through three slots, wherein each of the three slots is capable of injecting a tangential airflow to the internal volume of the nacelle over one-third of the inner perimeter of the nacelle.

\* \* \* \* \*